United States Patent [19]

Williams

[11] Patent Number: 5,020,024

[45] Date of Patent: May 28, 1991

[54] METHOD AND APPARATUS FOR DETECTING SELECTED ABSENCE OF DIGITAL LOGIC SYNCHRONISM

[75] Inventor: Jeffrey L. Williams, Hopkinton, Mass.

[73] Assignee: Stratus Computer, Inc., Marlboro, Mass.

[21] Appl. No.: 3,732

[22] Filed: Jan. 16, 1987

[51] Int. Cl.⁵ .................. G06F 1/04; G06F 1/12
[52] U.S. Cl. .................. 364/900; 364/270; 364/271; 364/271.3; 364/950; 364/950.3; 364/947; 364/947.2; 364/234; 364/234.1; 364/231.4; 364/231; 371/67.1
[58] Field of Search ... 364/200 MS File, 900 MS File; 371/36, 67.1, 683

[56] References Cited

U.S. PATENT DOCUMENTS

| 3,665,173 | 5/1972 | Bouricius et al. | 235/153 |
|---|---|---|---|
| 4,099,234 | 7/1978 | Woods et al. | 364/200 |
| 4,228,496 | 10/1980 | Katzman et al. | 364/200 |
| 4,322,580 | 3/1982 | Khan et al. | 371/61 |
| 4,323,966 | 4/1982 | Whiteside et al. | 364/200 |
| 4,330,826 | 5/1982 | Whiteside | 364/200 |
| 4,358,823 | 11/1982 | McDonald et al. | 364/200 |
| 4,428,044 | 1/1984 | Liron | 364/200 |
| 4,449,182 | 5/1984 | Rubinson | 364/200 |
| 4,453,215 | 5/1985 | Reid . | |
| 4,486,826 | 12/1984 | Wolff et al. | 364/200 |
| 4,503,490 | 3/1985 | Thompson | 371/61 |
| 4,503,535 | 3/1985 | Budde et al. | 364/200 |
| 4,507,784 | 3/1985 | Procter | 371/61 |
| 4,531,198 | 7/1985 | Matsuda | 364/900 |
| 4,574,348 | 3/1986 | Scallon | 364/200 |
| 4,580,243 | 4/1986 | Renner | 371/61 |
| 4,589,066 | 5/1986 | Lam | 364/200 |
| 4,597,084 | 6/1986 | Dynneson et al. | 371/51 |
| 4,644,498 | 2/1987 | Bedard et al. | 371/61 |
| 4,653,054 | 3/1987 | Liu et al. | 371/61 |
| 4,654,857 | 3/1987 | Samson et al. | 371/68 |
| 4,672,613 | 6/1987 | Foxworthy | 364/200 |
| 4,682,334 | 7/1987 | LeMouel | 371/55 |
| 4,695,975 | 9/1987 | Bedrij | 364/900 |
| 4,703,421 | 10/1987 | Abrant | 364/200 |
| 4,709,347 | 11/1987 | Kirk | 364/900 |
| 4,736,377 | 4/1988 | Bradley | 371/3 |
| 4,750,177 | 6/1988 | Hendrie et al. | 364/200 |
| 4,800,564 | 1/1989 | DeFazio | 371/61 |
| 4,809,169 | 2/1989 | Sfarti | 364/200 |
| 4,827,409 | 5/1989 | Dickson | 364/200 |
| 4,920,540 | 4/1990 | Baty | 371/61 |
| 4,974,144 | 11/1990 | Long | 364/200 |

*Primary Examiner*—Thomas C. Lee
*Assistant Examiner*—Eric Coleman
*Attorney, Agent, or Firm*—Lahive & Cockfield

[57] ABSTRACT

Digital logic equipment in which two logic elements operate with timing control from a clock element with selected synchronism, includes a failure detecting element which detects the absence of the selected synchronism between the two logic elements even when each is providing otherwise correct logic operation. The apparatus and method enable a digital logic system to follow two redundant digital logic elements so long as they operate in lock step synchronism, and to sense a failure which occurs only in synchronism to disable one of the two logic elements to maintain thereafter uninterrupted operation with the other logic element.

10 Claims, 3 Drawing Sheets

METHOD AND APPARATUS FOR DETECTING SELECTED ABSENCE OF DIGITAL LOGIC SYNCHRONISM

BACKGROUND OF THE INVENTION

This invention relates to a method and apparatus for detecting the absence of selected synchronism of two or more digital logic devices, when each is performing correct substantive operation.

The invention is useful in digital logic equipment and systems to detect when two or more operating elements, which normally operate with selected synchronism, lose that synchronism even though each is otherwise performing correct logic operation. The performance of correct logic operation by a digital logic device, even when with a loss of selected synchronism relative to another digital logic device, is herein termed correct substantive operation.

One application of the invention is in a fault-tolerant computer system where, for example, two central processor units normally operate identically and in lock step synchronism. If either one processor unit fails, the operation of the other continues, and keeps the system operating without interruption.

It is known to check the operation of each such CPU device in a system of this kind, and to disable one if it fails. U.S. Pat. No. 4,453,215 describes a digital logic system of this kind, and Stratus Computer of Marlboro, Mass., USA manufactures such fault tolerant computer equipment.

Further teachings regarding digital computer systems that employ redundant structure for increasing reliability include U.S. Pat. No. 4,428,044 of Liron and U.S. Pat. No. 4,228,496 of Katzman. See also, Rennels "Architecture for Fault-Tolerant Spacecraft Computers," Proceedings of the I.E.E.C., Vol. 66, No. 10, pp. 1255-1268 (1975).

In addition to a failure in logic operations, two or more digital processor or other logic devices, which normally operate with a common clock for a designated synchronism, are subject to loss of the designated synchronism even while continuing correct logic operation. This fault condition can go undetected, so that each device continues to operate, even though it is producing output information out of step with the other. The system then is likely to product faulty data, and eventually to fail completely.

The loss of synchronism between the two processor devices can occur, for example, due to spurious signals that actuate one device but not the other. Two nominally indentical devices also can fail because they in fact operate with different speeds due, for example, to design flaws and to variations in the components they employ.

Hence, prior fault-tolerant computer systems have been subject to failure by loss of specifyied synchronism, even when all devices are performing substantively correct operation.

It accordingly is an object of this invention to provide a method and apparatus for providing an improved level of fault tolerance in digital logic systems.

A particular object is to provide a method and apparatus for detecting a loss of prescribed synchronism in the operation of two or more digital logic devices, even when each is providing substantively correct operation.

Other objects of the invention will in part be obvious and will in part be set forth herein after.

BRIEF DESCRIPTION OF DRAWINGS

For a fuller understanding of the nature and objects of the invention, reference is to be made to the following description and the corresponding drawings, in which.

GENERAL DESCRIPTION

Digital logic apparatus according to the invention has a clock element and at least two operating devices. A synchronism checking element detects the absence of selected synchronism between the operating devices, when each is performing proper substantive operation.

A synchronism checking method and apparatus in accordance with the invention thus compares the operations of the devices being checked, and produces a failure-indicating output signal only when the comparison is false concurrent with each device otherwise providing correct logic operation, i.e., correct substantive operation.

In a typical preferred system, the two operating devices operate continually, e.g., respond actively to each system timing pulse. This continuous activity enables the synchronism checking element to detect promptly a loss of the desired synchronism. Hence the system can readily correct any erroneous data which results from the synchronism fault.

Further in accord with the invention, the detection of a synchronism fault in the manner described causes one of the two devices to cease operating with the system, so that only a single one of the two devices thereafter actuates other devices in the system. This action allows the system to continue operating, unaffected by the loss of synchronism.

Computer equipment and methods embodying the invention thus attain a further degree of fault-tolerance, in that they detect and respond correctively to an added fault condition. Practice of the invention thus attains improved computer reliability.

In one preferred practice of the invention, a fault tolerant computer system has at least two processor devices normally operating in lock step synchronism with each other to maintain system operation in case either one fails. The system removes one processor device from system operation, e.g., places it off line, in the event it loses synchronism with the other, even though both processor devices are otherwise operating correctly. U.S. patent application Ser. No. 927,746 now U.S. Pat. No. 4,816,990 for "Method and Apparatus for Fault-Tolerant Computer System Having Expandable Processor Section" and assigned to the assignee hereof describes a fault-tolerant computer system with which the invention can be practiced in the foregoing manner, and the disclosure of that application is incorporated herein.

DESCRIPTION OF ILLUSTRATED EMBODIMENT

Figure 1:
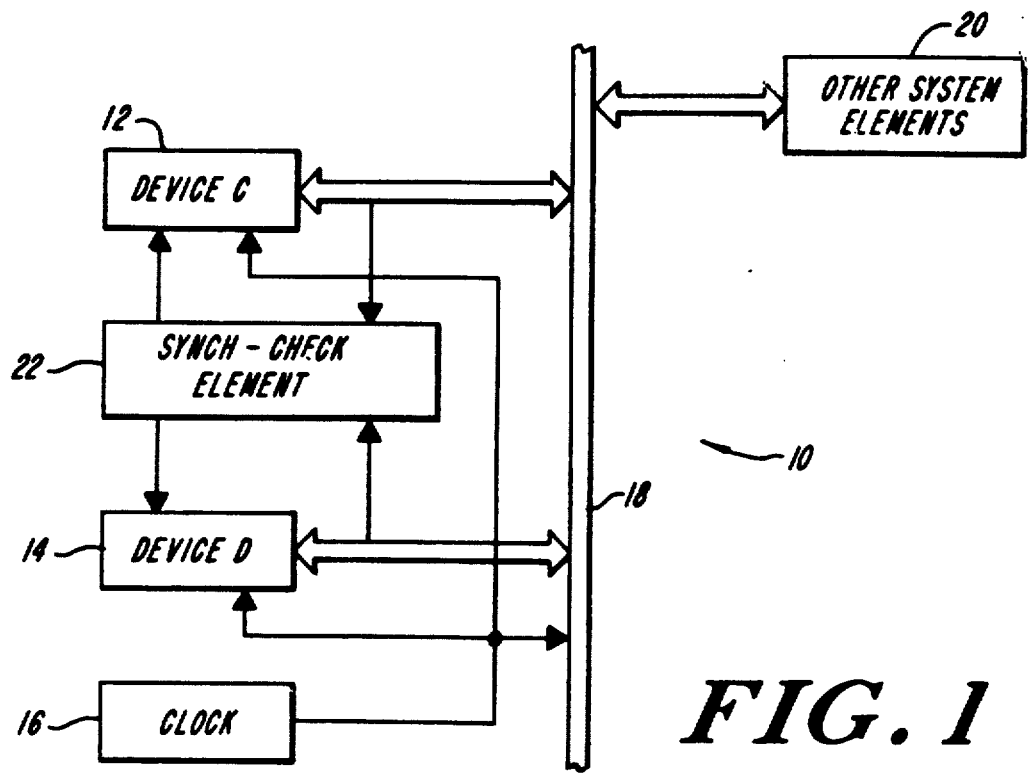
FIG. 1 is a block schematic representation of a digital logic system incorporating the invention.

FIG. 1 shows that a digital logic system 10 embodying the invention has two digital logic devices 12, 14 and system clock 16. The clock 16 is connected to provide timing pulses to each device 12, 14 and to a system bus 18 that connects to other system elements 20. Each logic device 12, 14, which are termed Device C and Device D, respectively, is also connected with the bus 18, as shown.

Where the illustrated system of FIG. 1 is a fault tolerant computer system, the devices 12, 14 can be identical central processor devices which provide identical redundant operation in lock step synchronism with one another and which the bus 18 connects with other system elements, including memory elements and I/0 elements. The above-mentioned U.S. Pat. No. 4,453,215, the cited pending application, and systems of Stratus Computer are constructed in this manner and provide such operation.

The illustrated system 10 further includes a synchronism checking element 22 connected to receive signals which each device 12, 14 produces and is further connected to selectively disable at least one of the devices 12, 14. The connections of the synch checking element 22 with each operating device 12, 14 are illustrated in FIG. 1 directly, for clarity of illustration, although they can be made by way of the bus 18.

With further reference to FIG. 1, in response to signals it receives from each operating device 12, 14, the synchronism checking element 22 detects a timing difference between the operations of the two devices. The illustrated fault tolerant computer system can, however, disable either device 10 or 12 if its substantive operation is faulty. In that event, the system depends on the other device to continue normal system operation. Accordingly, to avoid raising a synchronism fault when such a substantive fault occurs, the checking element 22 disregards a timing fault which coincides with an indication of faulty substantive operation of either device.

On the other hand, when the synchronism checking element 22 detects a timing difference and neither device 12 nor device 14 manifests faulty substantive operation, the synchronism checking element 22 reports a synchronism fault.

In one preferred embodiment, in response to the detection of a synchronism fault, the synchronism checking element 22 immediately disables one device 12 or 14, so that only the other one operates with the other system elements 20. The selection of which device 12 and 14 to disable often can be made arbitrarily, inasmuch as both devices are individually indicating correct substantive operation and the only fault being detected is a timing difference. One alternative is to disable the device which appears to be lagging in time. A further alternative is to actuate diagnostic logic to determine which device is indeed out of step, and thereupon to disable that device.

Figure 2:
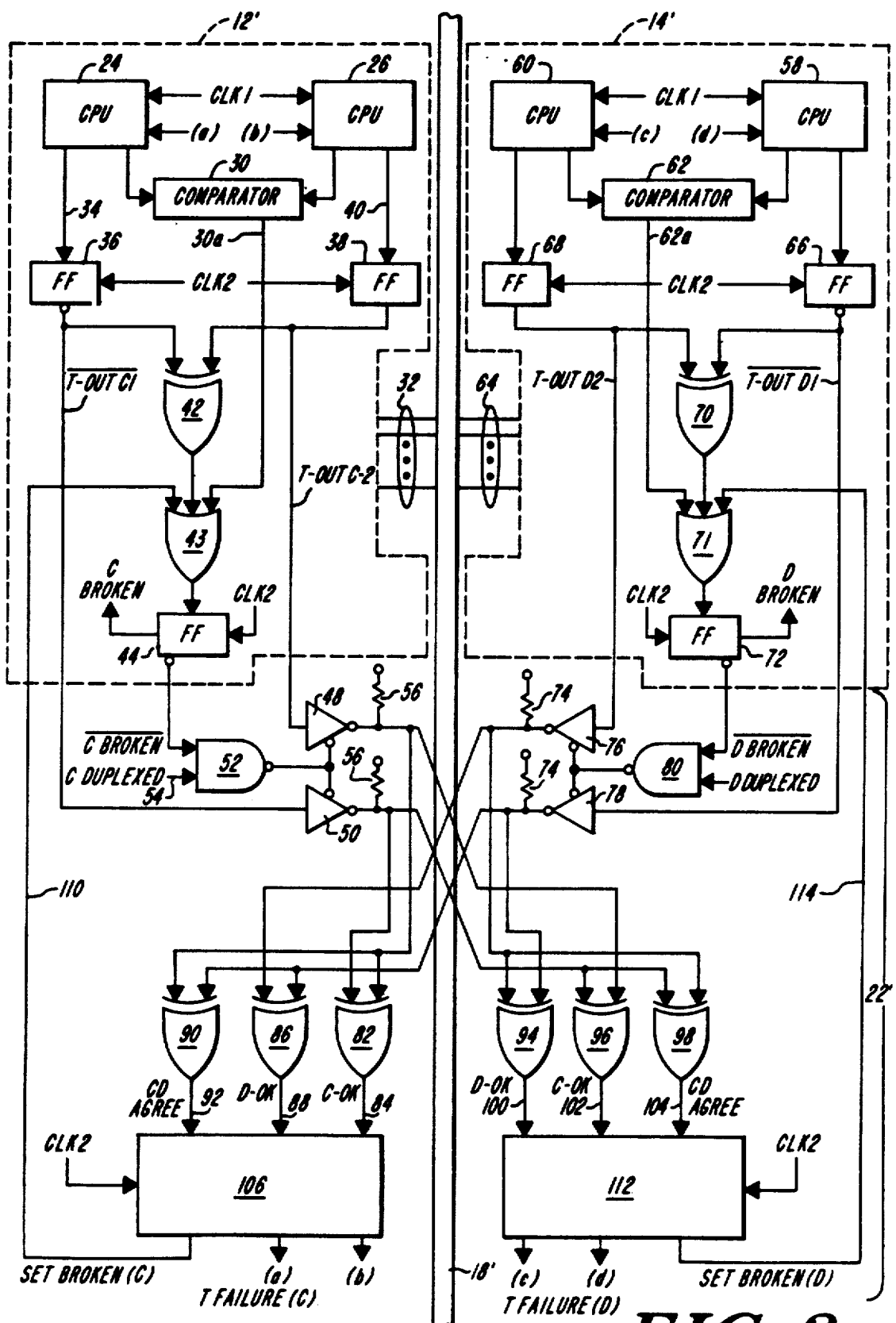
FIG. 2 is a block diagram of two self-checking digital logic devices for use in one practice of the invention.

In either case, the synchronism checking element 22 enables the system 10 to detect when the operation of the devices 12, 14 loses a desired synchronous condition, even when each device is otherwise providing correct logic operation. The synchronism checking element 22 accordingly enables the system 10 to avoid erroneous operation due to such a loss of synchronism and to continue operating, with the production of correct information.

Where the system 10 of FIG. 1 represents a fault-tolerant computer, the device 12 can be a self-checking central processor 12' as shown in FIG. 2. The illustrated central processor 12' has two central processor units 24 and 26, each employing, for example, a Motorola 68020 integrated circuit, arranged and connected to provide identical digital processor operation.

The central processor 12' has numerous connections, indicated at 32, to the bus 18', including for data, address, control, clock and diagnostic signals. One signal received from the bus 18' is a stream of system clock pulses, designated CLK1, which provides timing for operation of each CPU 24 and 26.

A comparator 30 compares the digital values of signals produced in each CPU 24 and 26. During normal operations the two sets of digital values are identical, and the comparator output allows both CPU's to apply data to the bus 18'. In response to a difference between the sets of digital values, the comparator produces a fault signal, on conductor 30a, which switches a flip flop 44 to a Broken state.

The resultant signal from the flip flop 44 indicates that the processor 12' is malfunctioning and hence is in a Broken condition. One function of the Broken signal from flip flop 44 is to take the processor 12' off line, i.e., to disable the processor 12' from applying further operating signals, such as data and address signals or commands, to the bus 18'.

In accordance with the invention, and as further shown in FIG. 2, a signal on a conductor 34 indicative of the activity of the CPU 24 is applied to a flip flop 36 that is switched with a timing signal CLK2. The illustrated CLK2 timing signal is derived from the system clock CLK1 and is a fractional multiple of it. In one illustrated embodiment, the CLK1 signal has a sixteen megahertz clock rate and the CLK2 signal has an eight megahertz clock rate.

With this arrangement, the flip flop 36 synchronizes the CPU Activity signal on conductor 34 with the timing of the CLK2 signal. The resultant signal at the complement output terminal of the flip flop 36 is the logic complement of a First Transaction Output signal for the processor 12'. This processor is designated Device C in FIG. 1 and hence the signal is designated a T-Output Cl (inverse) signal.

The CPU Activity Signal on the conductor 34 preferably is one which the CPU 24 produces at the same time during each processor cycle. Further, the Activity signal is preferably one which the CPU 24 produces even if it performs no operation, for example no bus cycle, during that operating cycle. Thus, the CPU Activity signal preferably is one which the CPU 24 produces at the exact same time during every operating cycle which it performs with timing initiated from the CLK1 signal. One illustrative example of the CPU Activity signal on conductor 34 is the Early Cycle Start (ECS) signal which a Motorola 68020 CPU produces in every processor cycle.

With further reference to FIG. 2, in the same manner described above for the CPU 24 and flip flop 36, a flip flop 38 synchronizes a CPU Activity Indicating signal which the CPU 26 produces on conductor 40 with the CLK2 timing signal, to produce a Second Transaction Output signal for the processor 12', i.e. a T-OutPut C2 signal.

An exclusive OR gate 42 receives the two Transaction Output signals and compares them. With the illustrated logic, the exclusive OR gate receives complementary, i.e. opposite, signals. It hence checks to determine if they are always different, i.e. one is a logic 0 and the other is a logic 1, as occurs during normal operation. In the event of a logic malfunction and the two complementary Transaction Output signals no longer differ, the exclusive OR gate 42 produces an assertive output signal that sets the flip flop 44 to the Broken state, by way of an OR gate 43.

The illustrated processor 12' applies each Transaction Output signal to the processor 14' with which it is partnered by way of the bus 18'. Accordingly, the T-Output C1 (inverse) signal and the T-Output C2 signal ar applied to separate bus drivers 48 and 50. An AND gate 52 enables each driver 48 and 50, unless the processor 12' is Broken or the partner processor 14' is not in synchronism with it. The AND gate 52 produces the Driver Enable signal in response to the inverse of the Broken signal from flip flop 44 and a Duplexed signal on conductor 54. The Duplexed signal is assertive so long as the processor 14' is operating correctly, i.e. is not Broken and is in lock step synchronism with the processor 12'. The illustrated logic employs open collector drivers 48 and 50. The output line from each driver is connected by a pull-up resistor 56 to a positive supply voltage, and is driven to ground by an assertive input signal.

The illustrated processor 14' of FIG. 2 is constructed identically to the processor 12' with a CPU 58 and a CPU 60. The clock signal CLK1 controls the timing of the CPUs 58 and 60, and a comparator 62 compares the logical outputs from the units. The processor 14' is connected by way of connections 64 with the bus 18'.

Flip flops 66 and 68 synchronize CPU Activity signals indicative of the activity of each CPU 58 and 60, respectively, with the CLK2 signal to produce respectively a T-Out D1 (inverse) signal and a T-Out D2 signal, as shown. An exclusive OR gate 70 compares the two Transaction output signals from the flip flops 66 and 68. In the event of faulty operation and the signals fail to differ, the X-OR gate 70 produces an assertive output signal that sets a flip flop 72 to produce a D Broken signal. Open-collector bus drivers 76 and 78, when enabled, apply the two Transaction Output signals D1 (inverse) and D2 to different conductors of the bus 18'. An AND gate 80 enables the drivers 76 and 78 unless either the processor 14' is Broken or it is not duplexed with the processor 12'.

With continued reference to the processor 12', as shown in FIG. 2, an exclusive OR gate 82 receives the logically opposite T-Output C1 (inverse) and T-Output C2 signals and, during normal operation when the two signals always differ, produces a C-OK signal on conductor 84. The C-OK signal accordingly is assertive so long as the two CPU devices 24 and 26 in the processor 12' are producing Activity signals on conductors 34 and 40 in lock step synchronism with one another. An assertive C-OK signal also tests the operation of the flip flops 36, 38, and 44, the gates 42, 43, and 52, and the drivers 48 and 50.

A further exclusive OR gate 86 in the processor 12' recieves the two Transactions output signals from the processor 14', by way of the bus 18' as shown, to produce a D-OK signal, on conductor 88, under the same normal conditions of proper operation for the processor 14'.

The processor 12' has a further exclusive OR gate 90 that receives one transaction output signal from the processor 12' and an inverse, i.e., logically opposite, transaction output signal from the processor 14'. The illustrated exclusive OR gate 90 accordingly receives as input signals the T-Out C2 signal and the T-Out D1 (inverse) signal. When these two signals differ, as is the normal correct operating condition, the resultant assertive output signal from the exclusive OR gate 90, on conductor 92, designates that the two processors 12' and 14' agree and accordingly is designated a C-D Agree signal. The normal, assertive value of this signal indicates that the two processors 12' and 14' are each producing Transaction Output signals identically and in lock step sychronism with one another.

As also shown in FIG. 2, in the same manner as shown for the processor 12', the illustrated processor 14' has three exlusive OR gates 94, 96 and 98 that normally produce, respectively, a D-OK signal on conductor 100, a C-OK signal on conductor 102, and a C-D Agree signal on conductor 104.

In the event the two processors 12' and 14' become out of synchronism, as can occur for example when one processor receives an additional spurious pseudo-clock signal, or when one of the two processors fails to respond to a timing signal due to a transient low voltage or other transient condition, each processor can continue to produce a pair of synchronized T-Out signals. That is, both the C-OK and the D-OK signals on conductors 84 and 86 may be assertive, i.e. true, in processor 12'; and similarly the C-OK and D-OK signals on conductors 100 and 102 of processor 14' may be true. Nevertheless, the C-OK signals will be out of synchronism from the D-OK signals, due to the loss of lock-step synchronism between the processors. The exclusive OR gate 90 in processor 12' accordingly no longer receives differing signals. Hence, the C-D Agree signal which the X-OR gate 90 produces terminates, thereby manifesting the loss of the requisite lock-step synchronism. At the same time, the X-OR gate 98 stops producing a C-D Agree signal in the processor 14'.

A logic stage 106 in the processor 12', in accordance with the invention, produces a Transaction Failure signal (T Failure) in the event the C-D Agree signal was absent, i.e., was false, in one timing interval of the CLK 2 signal, and yet the C-OK and the D-OK signals are true in the next timing interval. The illustrated logic stage 106 produces the T Failure signal as a pair of status bits that a CPU Status Bus (not shown) communicates from terminals (a) and (b) of the stage 106 to similarly labelled status inputs of the CPUs 24 and 26, respectively. Also in response to the T Failure signal, the illustrated logic stage 106 can produce a Set Broken signal, on conductor 110, for application through the OR gate 43 to switch the flip flop 44 to the Broken state.

More particularly, the logic stage 106 tests the two OK signals on conductors 84 and 88, with the Agree signal on conductor 92 produced in one prior clock-two (CLK2) interval, to produce the T-Failure signal only when a False value of the Agree signal is not due to either processor 12' or 14' being Broken. In the event, for example, the two CPU devices 24 and 26 in the self-checking processor 12' produce information which differs so that the comparator 30 produces a False output, the two activity signals which the units 24 and 26 produce and which the flip flops 36 and 38 apply to the exclusive OR gates 82 and 86 can nevertheless be identical and in synchronism. In this case, the processor 12' will produce erroneous information with the CPUs 24 and 26 and yet produce, for one interval of the CLK2 timing signal, true values for the C-OK, D-OK and the C-D Agree signals. One interval of the CLK2 signal ter, the False output from the comparator 30 switches the flip flop 44 to produce the C Broken signal. The resultant disabling of the devices 48 and 50 causes the C-OK and the D-OK signals, as well as the C-D Agree signal, all to become False.

Thus, in order to avoid producing a T Failure signal due to a condition that causes the processor 12' to become Broken, the logic unit 106 produces the T Failure signal only in response to True conditions for the C-OK signal and for the D-OK signal, and for a False value of the C-D Agree signal in the immediately preceeding CLK2 timing interval.

With this arrangement in the logic unit 106, and with an identical logic unit 112 in the processor 14', each logic unit produces a T-Failure signal when the only difference between the two processors 12' and 14' is that they are not operating in the desired sychronism, illustrated as lock step synchronism. Each processor 12' and 14' is otherwise operating with correct logic computations, and hence substantively correctly. In this event, the system in which the processors 12' and 14' are incorporated can operate properly with either of the two processors 12' and 14'. It is only the lack of synchronism between them that is a problem. Accordingly, either the processor 12' or 14' alone will operate properly with other system elements 20 (FIG. 1), and the other one can be shut down with no interruption of system operation. Accordingly, either logic stage 106 or 112, but typically not both of them, is arranged to set one Broken flip flop 44 or 72, respectively, and thereby to disable that one processor 12' or 14' and leave the other one operating without interruption. In one particular embodiment, the two processors 12' and 14' are connected to adjacently numbered odd and even backplane connectors of the digital logic system. Each logic unit 106 and 112 determines whether to produce a Set Broken signal, and thereby to disable that processor unit 12', 14' respectively, by testing whether it is connected to an odd-numbered slot connector.

As a further alternative, the invention can be practiced with a logic stage in each processor which determines which processor 12', 14' is either ahead or behind timing-wise relative to the other, and to determine accordingly which one processor to disable.

Figure 3:
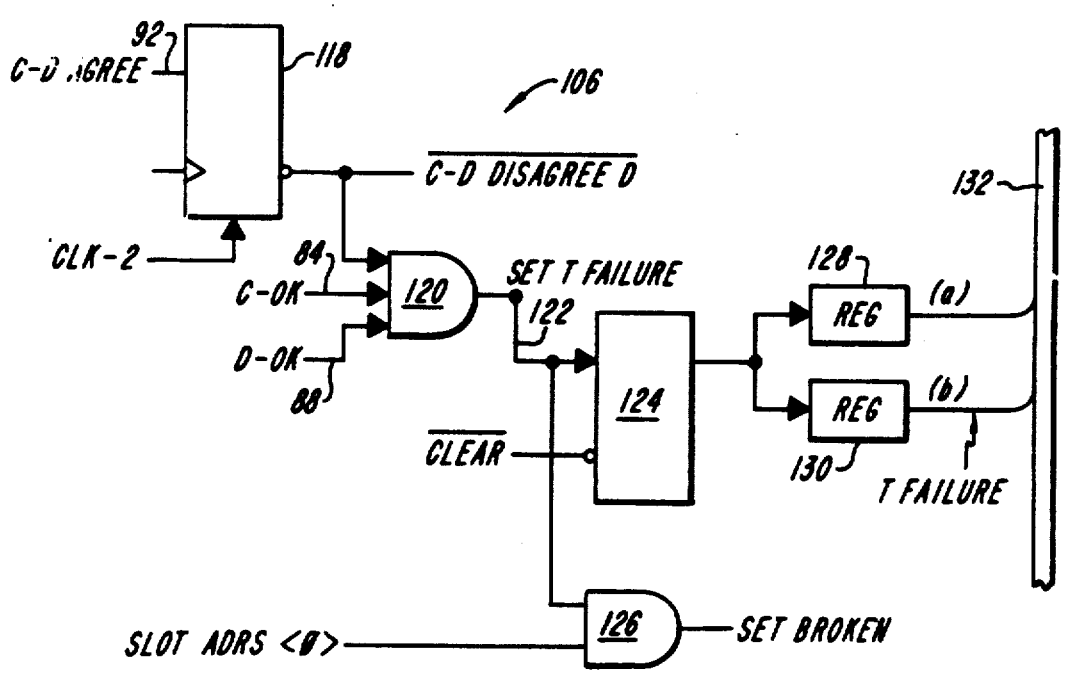
FIG. 3 is a block diagram of a synchronism checking logic circuit according to the invention for us in a device as shown in FIG. 2.

With reference to FIG. 3, the illustrated logic stage 106 of FIG. 2 has a flip flop 118 which synchronizes the C-D Agree signal, on conductor 92 of FIG. 2, with the CLK2 timing signal to produce, at the compliment output terminal, a C-D Agreed (inverse) signal. The C-D Agreed (inverse) signal is assertive when the Agree signal was false one single interval of timing signal CLK2 previously. An AND gate 120 receives as input signals the C-D Agreed (inverse) output from flip flop 118 and the C-OK and the D-OK signals from conductors 84 and 88 of FIG. 2. The AND gate 120 produces an assertive output signal only when both OK signals are True and Agreed (inverse) signal is True, i.e. the Agree signal was false one timing interval previously. This assertive output, on conductor 122 and designated Set T Failure, sets a Status flip flop 124. Buffer registers 128 and 130 store the resultant T Failure signal and apply it to conductors (a) and (b) of a CPU Data Bus 132. The Set T Failure signal on conductor 122 is also applied, in the illustrated logic stage 106, to an AND gate 126. The other input to the AND gate 126 is a Slot Address Odd signal. An assertive output signal from the AND gate 126 is the Set Broken signal applied to the FIG. 2 conductor 110 for disabling the processor 12' in the event it is plugged into an odd connector slot of the system.

The processor 14' preferably employs a logic stage 112 constructed in the same manner as just described with reference to FIG. 3 for the logic stage 106.

Figure 4:
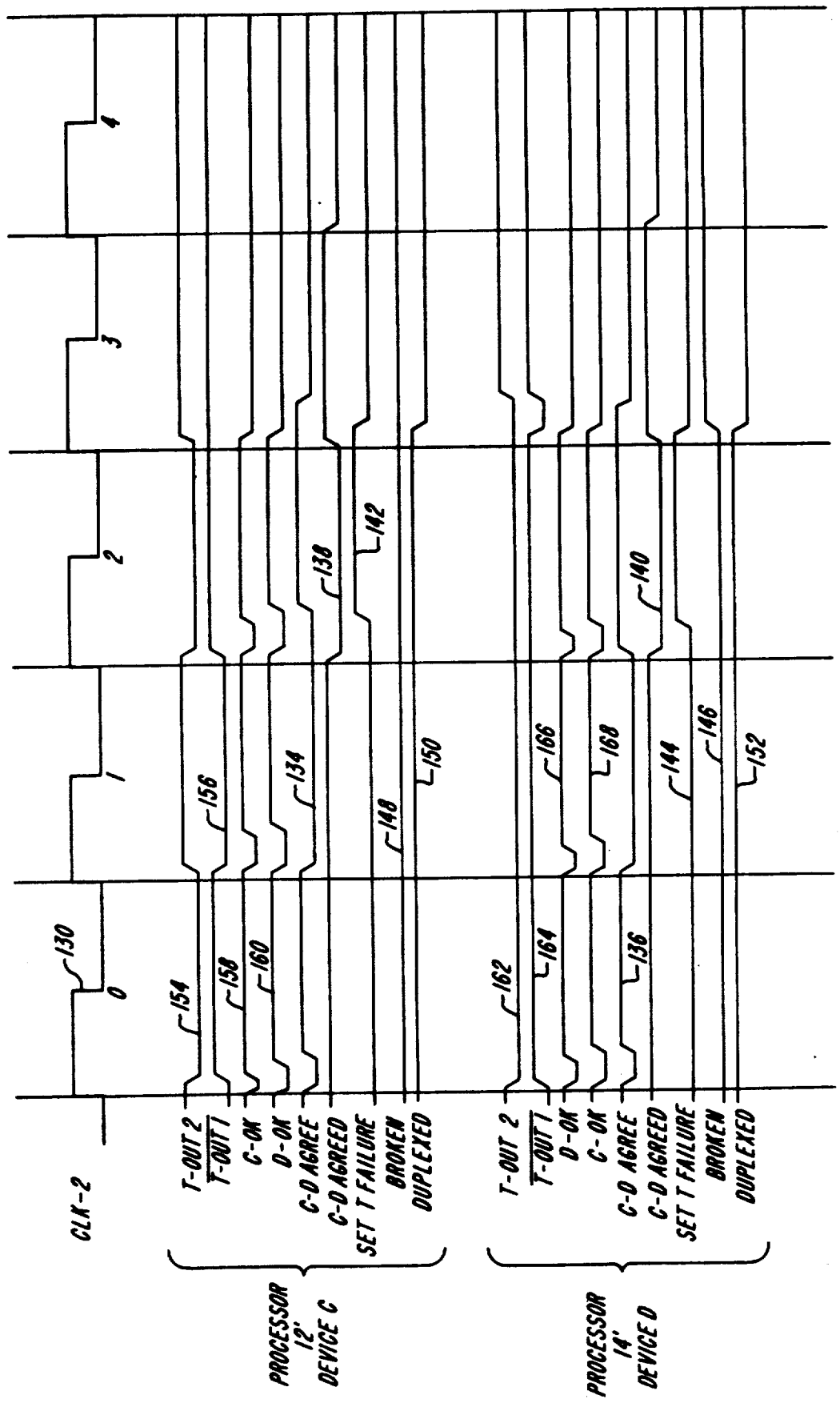
FIG. 4 is a timing chart illustrating operation of the logic circuits of FIGS. 2 and 3 in accordance with the invention.

The timing diagram of FIG. 4 illustrates operation of the processors 12' and 14' of FIG. 2. Wave form 130 illustrates the CLK2 timing pulses for several timing intervals.

The illustrated operation is for normal operation in Interval 0, and with a loss of synchronism in Interval 1, but with continued correct substantive operation.

The loss of synchronism in Interval 1 causes the C-D Agree signal in both processors 12' and 14', as shown with FIG. 4 wave forms 134 and 136, to be low and hence False in Interval 1. Consequently, the C-D Agreed signal in each processor, shown with wave forms 138 and 140, respectively, switches from the normally high True state to a low False state in Interval 2. This transition causes the Set T Failure signals in the two processors, represented with wave forms 142 and 144, to become assertive, i.e., True, in Interval 2. Where the logic stages 106 and 112 are arranged to take the processor 14' off line in response to a T Failure, the next action, in Interval 3, is that the Broken signal in processor 14', Device D in FIG. 1, switches to the high True value as designated with wave form 146. The other processor 12', Device C, remains on line and correspondingly the Broken signal therein, shown with wave form 148, remains in the low False state.

Also in timing Interval 3, the Duplexed signal in each processor, illustrated for the two processors with wave forms 150 and 152 respectively, drop from a normally high True condition to a low False condition. At this juncture the OK and Agree signals in both processors all become False.

More particularly, in the processor 12', Device C, the clocked Transaction Output signals, which the enabled drivers 48 and 50 apply to the bus 18' and as represented with wave forms 154 and 156, synchronously change binary value in opposite directions in response to each rising edge of the CLK2 timing pulses during timing Intervals 0, 1 and 2. The drivers, however, are disabled commencing in Interval 3, and accordingly the output signals from them are pulled up to the high True value.

Correspondingly, the C-OK and D-OK signals on the processor 12' conductors 84 and 86, as designated with wave forms 158 and 160, switch to the high True value in each Interval 0, 1 and 2, and thereafter are at the low False value.

As further shown in FIG. 4, in the other processor 14', Device D, the Transaction Output signals which the Bus drivers 76 and 78 apply to the Bus 18' and as represented with wave forms 162 and 164, switch in opposite directions in Interval 0 and, in the illustrated example where a synchronism fault occurs, fail to switch in Interval 1. In Interval 3 when the drivers 76 and 78 are no longer enabled, these signals are pulled up to the high True value. The D-OK and C-OK signals in the processor 14', represented with wave forms 166 and 168, switch to the high True value in each Interval 0, 1 and 2, in response to the differing values of the Transaction Output signals in that processor during each of these intervals.

As shown with wave forms 134 and 136, in both processors, the Agree signals, on FIG. 2 conductors 92 and 104 respectively, are True in Interval 0 inasmuch as the exclusive OR gates 90 and 98 receive differing Transaction Output signals. This normal condition however is not present in Interval 1, due to the failure of the Transaction Output signals in processor 14' to switch. Accordingly the two Agree signals switch to the low False value in Interval 1. The Agree signals return to the high True value in Interval 2 and, in Interval 3 switch to the False low value due to all the OK signals having the same value as a result of the OK signals being False.

The Agreed signals, wave forms 138 and 140 and produced in each logic stage 106 and 112 as illustrated in FIG. 3, remain True during both Intervals 0 and 1, and switch to the low False value in Interval 2 in response to the Agree signal switching to the False value in the preceeding Interval 1.

With further reference to FIG. 4, in the event the failure of the processor 14' Transaction Out signals, wave forms 162 and 164, to switch during Interval 1 was due to a fault other than loss of synchronism, the two OK signals in that processor, wave forms 166 and 168, would not both switch to the True value in Interval 2. Consequently, in Interval 2, the AND circuit 120, FIG. 3, in the logic stage 106, would not produce a True value of the Set T Failure signal of wave form 144. Similarly, in the processor 12', the Set T Failure signal represented with wave form 142 would remain False, i.e., low.

In this manner, the synchronism monitoring logic which the invention provides detects a loss of desired synchronism relative to a timing signal, and determines when the loss of synchronism occurs without a failure of substantive logic.

It will thus be seen that the objects set forth above, among those made apparent from the preceeding description, are efficiently obtained. Since certain changes may be made in the above constructions and in carrying out the above method, without departing from the scope of the invention, it is intended that all matter contained in the above description be interpreted as illustrative and not in a limiting sense.

It is also to be understood that the following claims are intended to cover all of the generic and specific features of the invention herein described, and all statements of the scope of the invention, which, as a matter of language, might be said t fall therebetween.

Having described the invention, what is claimed as new and secured by Letters Patent is:

1. In digital logic apparatus having a clock element and having first and second digital logic elements, each of which executes computational logic operations and which together are arranged for providing comparable substantive operation with selected synchronism relative to said clock element, the improvement comprising
  A. means for detecting comparable substantive operation of said first and second logic elements,
  B. means for producing a first output signal in response to comparable substantive operation of said first and second elements coincident with said selected relative synchronism, and for producing said first output signal identically in response to non-comparable substantive operation of said first and second elements, and
  C. means for producing a different second output signal in response to comparable substantive operation of said first and second elements coincident with the absence of said selected relative synchronism.

2. In digital logic apparatus having a clock element and having first and second digital logic elements, each of which executes computational logic operations and which together are arranged for providing comparable substantive operation with selected synchronism relative to said clock element, the improvement comprising
  A. means for detecting comparable substantive operation of said first and second logic elements,
  B. failure detecting means, in circuit with said means for detecting comparable substantive operation, for detecting the coincidence of (i) the absence of said synchronism and (ii) comparable substantive operation of said first and second logic elements,
  C. at least one further digital logic element operating in response to said substantive operation of at least one of said first and second elements and with timing control by said clock element, and
  D. disabling means responsive to said detection of the absence of said synchronism for maintaining only one of said first and second elements operative with said further element.

3. In the operation of digital logic apparatus having a clock element and having first and second digital elements arranged for providing comparable substantive operation with selected synchronism relative to said clock element, the improvement comprising the steps of
  A. detecting comparable substantive operation of said first and second logic elements,
  B. producing a first output signal in response in comparable substantive operation of said first and second elements coincident with said selected synchronism and producing said first output signal identically in response to non-comparable substantive operation of said first and second elements, and
  C. producing a different second output signal in response to comparable substantive operation of said first and second elements coincident with the absence of said selected synchronism therebetween.

4. In the operation of digital logic apparatus having a clock element and having first and second digital elements arranged for providing comparable substantive operation with selected synchronism relative to said clock element, the improvement comprising the steps of
  A. detecting comparable substantive operation of said first and second logic elements,
  B. detecting the coincidence of the absence of said selected synchronism and comparable substantive operation of said first and second logic elements,
  C. operating at least one further digital logic element in response to said substantive operation of at least one of said first and second elements and with timing control by said clock element, and
  D. responding to said detection of said coincidence condition for maintaining only one of said first and second elements operative with said further element.

5. In digital logic apparatus having a clock element and having first and second digital logic elements, each of which executes computational logic operations and which together are arranged for providing comparable substantive operation with selected synchronism relative to said clock element, the improvement comprising
  A. means for detecting comparable substantive operation of said first and second logic elements, and
  B. failure detecting means in circuit with said means for detecting comparable substantive operation, for detecting the coincidence of (i) the absence of said synchronism and (ii) comparable substantive operation of said first and second logic elements, said failure detecting means including means for detecting an absence of lock step synchronism between said first and second digital logic elements during identical substantive operation thereof.

6. In digital logic apparatus having a clock element and having first and second digital logic elements, each of which executes computational logic operations and which together are arranged for providing comparable substantive operation with selected synchronism relative to said clock element, the improvement comprising
   A. means for detecting comparable substantive operation of said first and second logic elements, and
   B. failure detecting means, in circuit with said means for detecting comparable substantive operation, for detecting the coincidence of (i) the absence of said synchronism and (ii) comparable substantive operation of said first and second logic elements, said failure detecting means including means for comparing the operations of said first and second devices during a first timing cycle of said clock element, with a comparison of said operations of said first and second devices during a preceding timing cycle of said clock element, for producing said detection of the absence of said synchronism.

7. In digital logic apparatus having a clock element and having first and second digital logic elements, each of which executes computational logic operations and which together are arranged for providing comparable substantive operation with selected synchronism relative to said clock element, the improvement comprising
   A. means for detecting comparable substantive operation of said first and second logic elements, and
   B. failure detecting means, in circuit with said means for detecting comparable substantive operation, for detecting the coincidence of (i) the absence of said synchronism and (ii) comparable substantive operation of said first and second logic elements, said failure detecting means including means for comparing the operations of each of said first and second devices during a first timing interval of said clock element with a signal responsive to the presence of said selected synchronism and said comparable substantive operation of said first and second logic elements in a preceding timing interval of said clock element.

8. In digital logic apparatus according to claim 7, the further improvement in which said comparing means produces a signal manifesting said detection of the absence of said synchronism during comparable substanive operation in response to an invalid comparison in said preceding interval and a valid comparison of operation in said first interval.

9. In digital logic apparatus having a clock element and having first and second digital logic elements, each of which executes computational logic operations and which together are arranged for providing comparable substantive operation with selected synchronism relative to said clock element, the improvement comprising
   A. failure detecting means for detecting the coincidence of (i) the absence of said synchronism and (ii) comparable substantive operation of said first and second logic elements,
   B. means for producing a selected control signal value only in response to the detection of said coincidence condition,
   C. at least one further digital logic element operating in response to said comparable substantive operation of at least one of said first and second logic elements, and
   D. means for normally maintaining said further element operative with any of said first and second elements that has comparable substantive operation, and responsive to said detection of said coincidence condition for thereupon maintaining said further element operative with only a single one of said first and second logic elements.

10. Digital data processor apparatus for substantially uninterrupted operation int eh event of an error-producing fault, said apparatus having multiple functional units including at least first and second processor units, a memory unit, a peripheral control unit for input/output operation, and a clock unit, said first and second processor units being arranged for normally operating identically with lock step synchronism for operating with other of said units and each arranged for operating substantially without interruption in the event the other becomes faulty, said apparatus having the improvement comprising
   synchronism monitoring means connected with each of said first and second processor units and producing a failure indicating signal that has a first value which indicates a first condition differently from any of second and of third conditions, where said first condition is a loss of synchronism between said first and second processor units which occurs in the absence of faulty logic operation thereof, where said
   second condition is a normal correct operating condition of said first and second processor units, and where said third condition is a condition wherein at least one of said processor units is operating with incorrect logic.

* * * * *